(12) United States Patent
Godon et al.

(10) Patent No.: US 9,346,134 B2
(45) Date of Patent: May 24, 2016

(54) PROCESS FOR MAKING A METAL PART SUCH AS A TURBINE ENGINE BLADE REINFORCEMENT

(75) Inventors: Thierry Godon, Sevran (FR); Bruno Jacques Gérard Dambrine, Le Châtelet-en-Brie (FR); Alain Robert Yves Perroux, Ris Orangis (FR)

(73) Assignee: SNECMA, Paris (FR)

( * ) Notice: Subject to any disclaimer, the term of this patent is extended or adjusted under 35 U.S.C. 154(b) by 111 days.

(21) Appl. No.: 14/002,482

(22) PCT Filed: Feb. 29, 2012

(86) PCT No.: PCT/FR2012/050422
§ 371 (c)(1),
(2), (4) Date: Aug. 30, 2013

(87) PCT Pub. No.: WO2012/117200
PCT Pub. Date: Sep. 7, 2012

(65) Prior Publication Data
US 2013/0333215 A1    Dec. 19, 2013

(30) Foreign Application Priority Data

Mar. 1, 2011  (FR) ...................................... 11 51649

(51) Int. Cl.
*B23K 20/02*     (2006.01)
*B23P 15/04*     (2006.01)
(Continued)

(52) U.S. Cl.
CPC . *B23P 15/04* (2013.01); *B22F 5/04* (2013.01); *B23K 20/021* (2013.01);
(Continued)

(58) Field of Classification Search
CPC ....... B23P 15/04; C22C 47/04; C22C 47/064; C22C 47/20; B22F 5/04; B23K 20/021; F04D 29/023; Y10T 29/49337; Y10T 29/49336; Y10T 29/49332
See application file for complete search history.

(56) References Cited

U.S. PATENT DOCUMENTS 5,439,750 A    8/1995  Ravenhall et al.
5,440,806 A    8/1995  Wei et al.
(Continued)

FOREIGN PATENT DOCUMENTS

DE        100 05 250      8/2000
EP         0 993 939       4/2000
(Continued)

OTHER PUBLICATIONS

International Search Report as issued for PCT/FR2012/050422.

*Primary Examiner* — Sarang Afzali
*Assistant Examiner* — Ruth G Hidalgo-Hernande
(74) *Attorney, Agent, or Firm* — Pillsbury Winthrop Shaw Pittman LLP

(57) ABSTRACT

A process for manufacturing a metal part such as a metal reinforcement for the blade of a turbine engine, which includes: manufacturing a three-dimensional metal structure made up of an insert which exhibits properties which allow superplastic forming and diffusion welding to be carried out, and of multiple metal wires encircling the periphery of the insert, where the metal structure forms a preform of the metal part; positioning the metal structure in a forming tool and hot-pressing the three-dimensional metal structure which causes agglomeration of the metal structure so as to obtain the compact metal part.

14 Claims, 3 Drawing Sheets

(51) Int. Cl.
  *B64C 11/20*  (2006.01)
  *C22C 47/20*  (2006.01)
  *F01D 5/14*  (2006.01)
  *F01D 5/28*  (2006.01)
  *F04D 29/02*  (2006.01)
  *F04D 29/32*  (2006.01)
  *B22F 5/04*  (2006.01)
  *C22C 47/04*  (2006.01)
  *C22C 47/06*  (2006.01)
  *B64D 27/00*  (2006.01)
  *B29C 65/00*  (2006.01)
  *B29L 31/08*  (2006.01)
  *B29C 65/48*  (2006.01)

(52) U.S. Cl.
  CPC ............ *B64C 11/205* (2013.01); *C22C 47/04* (2013.01); *C22C 47/064* (2013.01); *C22C 47/20* (2013.01); *F01D 5/147* (2013.01); *F01D 5/282* (2013.01); *F04D 29/023* (2013.01); *F04D 29/324* (2013.01); *B23K 2201/001* (2013.01); *B23K 2203/14* (2013.01); *B29C 65/48* (2013.01); *B29C 65/483* (2013.01); *B29C 66/12461* (2013.01); *B29C 66/12463* (2013.01); *B29C 66/301* (2013.01); *B29C 66/53* (2013.01); *B29C 66/721* (2013.01); *B29C 66/742* (2013.01); *B29L 2031/082* (2013.01); *B64D 2027/005* (2013.01); *F05D 2230/20* (2013.01); *F05D 2240/303* (2013.01); *F05D 2240/304* (2013.01); *Y02T 50/66* (2013.01); *Y02T 50/672* (2013.01); *Y02T 50/673* (2013.01); *Y10T 29/49337* (2015.01)

(56) References Cited

U.S. PATENT DOCUMENTS 6,658,715 B1 * 12/2003 Podesta' .................. 29/419.1
7,510,778 B2 *  3/2009 Bernard et al. ............. 428/610

FOREIGN PATENT DOCUMENTS

| EP | 993939 A1 | * | 4/2000 |
| EP | 1 719 699 | | 11/2006 |
| EP | 1 908 919 | | 4/2008 |

* cited by examiner

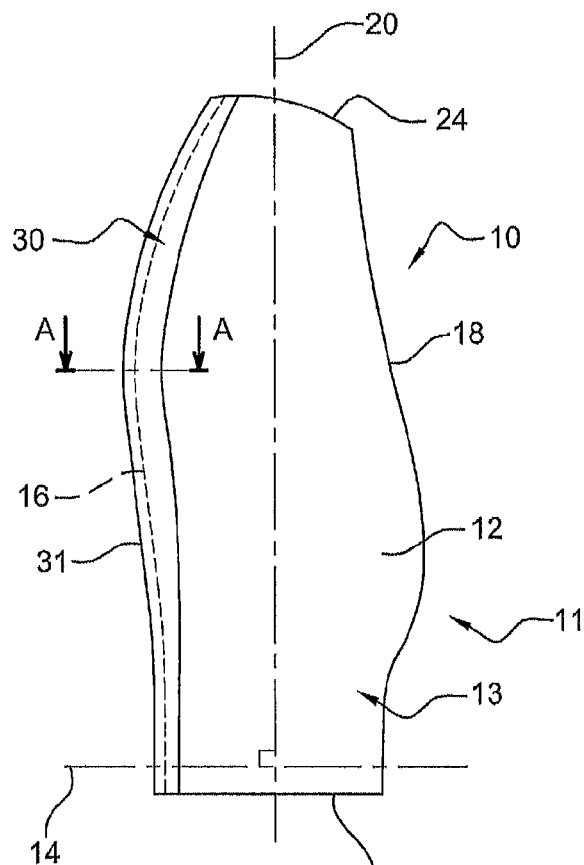
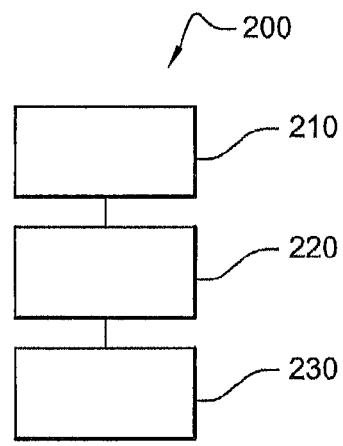
Fig. 3
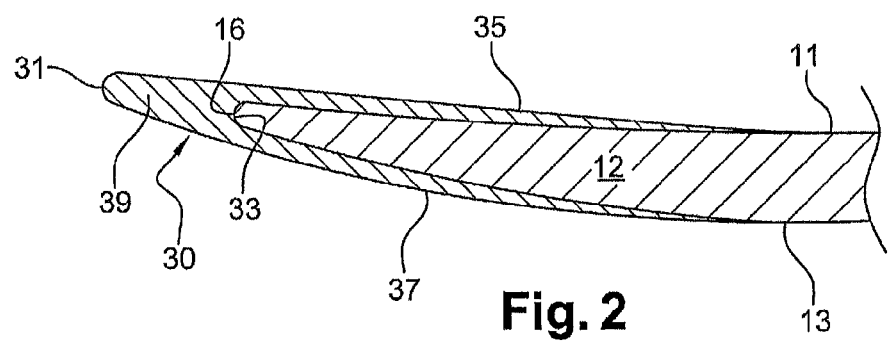
Fig. 2

US 9,346,134 B2

PROCESS FOR MAKING A METAL PART SUCH AS A TURBINE ENGINE BLADE REINFORCEMENT

CROSS-REFERENCE TO RELATED APPLICATIONS

This is the U.S. National Stage of PCT/FR2012/050422, filed Feb. 29, 2012, which in turn claims priority to French Patent Application No. 1151649, filed Mar. 1, 2011, the entire contents of all applications are incorporated herein by reference in their entireties

FIELD

The present invention relates to a process for making a metal part such as a metal reinforcement for a composite or metal turbine engine blade.

More particularly the invention relates to a process for making a metal reinforcement for the leading edge or trailing edge of a blade of a turbine engine.

The field of the invention is that of turbine engines and more particularly that of turbine engine fan blades made of composite or metallic materials and whose leading edge includes a metal structural reinforcement.

BACKGROUND

It should be recalled that the leading edge corresponds to the front part of an aerodynamic profile which meets the air-flow and which divides the flow of air into an intrados or lower-surface airflow and an extrados or upper-surface airflow. The trailing edge corresponds to the rear part of an aerodynamic profile where the intrados and extrados flows re-unite.

The turbine engine blades, and in particular fan blades, are subjected to high levels of mechanical stress, associated in particular with the speed of rotation, and must meet strict weight and overall size conditions. Consequently blades made of composite materials are used which are lighter.

Fan blades fitted to turbine engines are known which are made of composite materials, and in which a metal structural reinforcement extends over the entire height on either side of their leading edge as stated in document EP1908919. Such a reinforcement protects the composite blading during impacts by foreign bodies on the fan, such as, for example, a bird, hail or even stones.

In particular the metal structural reinforcement protects the leading edge of the composite fan by preventing the possibility of de-lamination, fibre breakage or damage due to fibre/matrix bonding failure.

Conventionally a turbine engine blade includes an aerodynamic surface which extends, in a first direction, between a leading edge and a trailing edge and, in a second direction which is substantially perpendicular to the first direction, between the root and the tip of the blade. The metal structural reinforcement follows the shape of the leading edge of the aerodynamic surface of the blade and extends in a first direction on either side of the leading edge of the aerodynamic surface of the blade to follow the profile of the intrados and of the extrados of the blade, and in the second direction between the root and the tip of the blade.

In a known manner the metal structural reinforcement is a metal part made of titanium manufactured entirely by milling from a block of material.

However, the metal reinforcement of a leading edge of a blade is a complex part to make, requiring numerous re-work operations and complex tooling which involves high manufacturing costs.

SUMMARY

The invention is applicable to the manufacture of a metal reinforcement intended to reinforce a leading edge or trailing edge of a blade of any type of turbine engine, for use on the ground or for aeronautical use and in particular a helicopter turboshaft engine or an aircraft jet turbine engine, but also propellers such as double fan contra-rotating non-faired propellers or open rotors propellers.

The invention is also applicable to the manufacturing of all one-piece metal parts with complex geometric shapes.

In this context the invention aims to resolve the above-mentioned problems by proposing a process for manufacturing a metal reinforcement for a leading edge or trailing edge of a turbine engine blade which significantly reduces the manufacturing costs for such a part and which simplifies the manufacturing operation.

To this end the invention proposes a process for manufacturing a metal part, such as a turbine engine blade metal reinforcement, which successively involves:
  a step for manufacturing a three-dimensional metal structure made up of an insert which has properties which allow superplastic forming and diffusion welding to be carried out, and of multiple metal wires encircling the periphery of said insert, where said metal structure forms a preform of said metal part;
  a step in which said metal structure is positioned in a forming tool:
  a hot-pressing step of said three-dimensional metal structure which causes agglomeration of said metal structure, so as to obtain said compact metal part.

Thanks to the invention, the metal part such as, for example, a metal structural reinforcement which includes two curves along two distinct planes (or twisting around an axis), is manufactured simply and quickly by manufacturing a metal structure beforehand formed by the combination of an insert and of metal wires shaped so as to create a metal winding around the insert, thus creating a metal skeleton around the insert, and of a hot pressing and/or compacting process which allows a compact part to be obtained. Advantageously the hot pressing process is an isostatic pressing or compacting process (HIP or Hot Isostatic Pressing) which allows a compact non-porous part to be obtained through a combination of plastic deformation, creep and diffusion welding.

The metal wires are produced using a die whose cross-section could equally well be circular, square, or hexagonal etc.

Advantageously the insert is made to follow the form of the neutral axis of the part to be made, such that the metal structure that is fabricated forms a preform of the part to be made which is easily positionable in the forming tool.

The metal structure that is made is consequently a structure that is easily transportable and easy to position in the forming tool, irrespective of the complex shape of the part to be made, such as blade reinforcements, parts which exhibit involute non-developable shapes or even parts which have envelope shapes such as, for example, a part which partly overlaps the end of a blade.

Advantageously, the lengths and diameters of the metal wires used to make the metal structure are variable and depend on the shape of the part to be made such as, for example, a blade reinforcement.

This manufacturing process thus overcomes the need for the complex manufacture of a blade reinforcement using milling or broaching-type bulk machining from flats which requires the use of large volumes of materials and consequently high raw material supply costs. The process also allows metal reinforcements to be easily made which meet strict mass and/or geometric requirements.

Advantageously the metal part is a metal reinforcement of the leading edge or trailing edge of the fan blade of a turbine engine.

The process for manufacturing a metal part according to the invention may also exhibit one or more of the characteristics below, considered individually or according to all technically possible combinations:
- said process is a process for manufacturing a metal reinforcement for a leading edge, or trailing edge, of a turbine engine blade, or of a metal reinforcement of a propeller such that said metal part obtained during said hot pressing step is a metal reinforcement;
- said hot pressing step is an isostatic pressing step or an isothermal forging step;
- said step for making a three-dimensional metal structure successively involves:
  - a first sub-step for manufacturing an insert;
  - a second sub-step for winding multiple metal wires around said insert;
- said step for making a three-dimensional metal structure successively involves:
  - a first sub-step for manufacturing an insert;
  - a second sub-step of bending said multiple metal wires such that each metal wire exhibits at least one loop;
  - a third sub-step of inserting said insert in each of said loops of said multiple metal wires;
- said sub-step for manufacture of said insert is achieved by forging or machining or by casting or by a three-dimensional weaving process;
- said insert is a metal insert;
- said metal wires of said multiple wires are bent into an A-shape;
- said metal wires are titanium-based metal wires and/or SiC-Titanium wires and/or SiC-Boron wires;
- said process successively involves:
  - a step for the manufacture of multiple three-dimensional metal structures made up of an insert and of multiple metal wires surrounding said insert, where said multiple metal structures form a pre-form of said metal part;
  - a step for positioning said multiple metal structures in a forming tool;
  - a hot-pressing step of said three-dimensional multiple metal structures which causes agglomeration of said multiple metal structures so as to obtain said metal part.

BRIEF DESCRIPTION OF THE DRAWINGS

Other characteristics and advantages of the invention will emerge more clearly from the following description given below which is for indication purposes and is not in any way restrictive, with reference to the appended figures, in which:

FIG. 1 is a side view of a blade which includes a leading edge metal structural reinforcement obtained by means of the manufacturing process according to the invention;

FIG. 2 is a partial sectional view of the blade shown in FIG. 1 along the plane of a section AA;

FIG. 3 is an overview diagram which shows the main steps in the manufacture of a metal structural reinforcement of the leading edge of a blade of a turbine engine for the manufacturing process according to the invention;

DETAILED DESCRIPTION

Figure 4A:
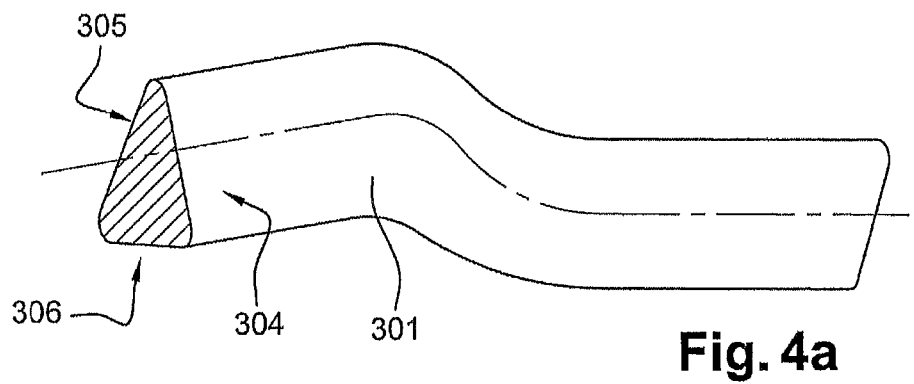
FIGS. 4a, 4b, 4c represent lengths of a metal reinforcement of the leading edge of the blade of a turbine engine which show the various phases in the first step of the process shown in FIG. 3.

Elements common to all figures bear the same reference numbers unless otherwise stated.

FIG. 1 is a side view of a blade which includes a metal structural reinforcement of the leading edge obtained by means of the manufacturing process according to the invention.

The blade 10 that is illustrated is, for example, a moving fan blade of a turbine engine (not represented).

The blade 10 has an aerodynamic surface 12 which extends along a first axial direction 14 between a leading edge 16 and a trailing edge 18 and along a second radial direction 20, substantially perpendicular to the first direction 14 between a root 22 and a tip 24.

The aerodynamic surface 12 forms the extrados 13 and intrados 11 surface of the blade 10. Only the extrados 13 surface of the blade 10 is shown in FIG. 1. The intrados 11 and the extrados 13 form the lateral surfaces of the blade 10 which link the leading edge 16 to the trailing edge 18 of the blade 10.

In this embodiment the blade 10 is a composite blade typically obtained by the forming of a woven fibrous texture. By way of an example, the composite material used may be composed of an assemblage of woven carbon fibres and a resin-based matrix, the entire system being formed by moulding using an RTM ("Resin Transfer Moulding") or VARTM ("Vacuum Resin Transfer Moulding") type of resin injection process.

The blade 10 includes a metal structural reinforcement 30 adhered to its leading edge 16 and which extends both in the first direction 14 on either side of the leading edge 16 of the aerodynamic surface 12 of the blade 10 and along the second direction 20 between the root 22 and the tip 24 of the blade.

As shown in FIG. 2 the structural reinforcement 30 follows the shape of the leading edge 16 of the aerodynamic surface 12 of the blade 10 that it extends, to form a leading edge 31 called the leading edge of the reinforcement.

Conventionally, the structural reinforcement 30 is a single-piece part which includes a substantially V-shaped section which has a base 39 forming the leading edge 31 and which is extended by two side flanks 35 and 37 which respectively follow the intrados 11 and extrados 13 of the aerodynamic surface 12 of the blade. The flanks 35, 37 exhibit a tapering or thinned profile in the direction of the trailing edge of the blade.

The base 39 includes a rounded-off internal profile 33 which matches the rounded shape of the leading edge 16 of the blade 10.

The structural reinforcement 30 is metallic and preferentially titanium-based. This material in effect exhibits a high capacity for absorbing energy due to impacts. The reinforcement is attached by adhesion to the blade 10 using adhesive known to those skilled in the art such as, for example, an epoxy adhesive.

This type of metal structural reinforcement 30 used for reinforcing the composite blade of a turbine engine is described more specifically in patent application EP1908919.

The process according to the invention in particular allows a structural reinforcement as shown in FIG. 2 to be manufactured, where FIG. 2 shows the reinforcement 30 in its final state.

FIG. 3 represents an overview diagram which illustrates the main steps in the manufacturing process 200 of a metal part which enables, for example, a metal structural reinforcement 30 of the leading edge of a blade 10 such as illustrated in FIGS. 1 and 2, to be produced.

The first step 210 in the manufacturing process 200 is a step for manufacturing a metal structure 310 which forms a preform of the part to be made by the process according to the invention. This step 210 is in particular shown in FIGS. 4a, 4b and 4c which represent various phases in this first step 210.

Figure 4B:
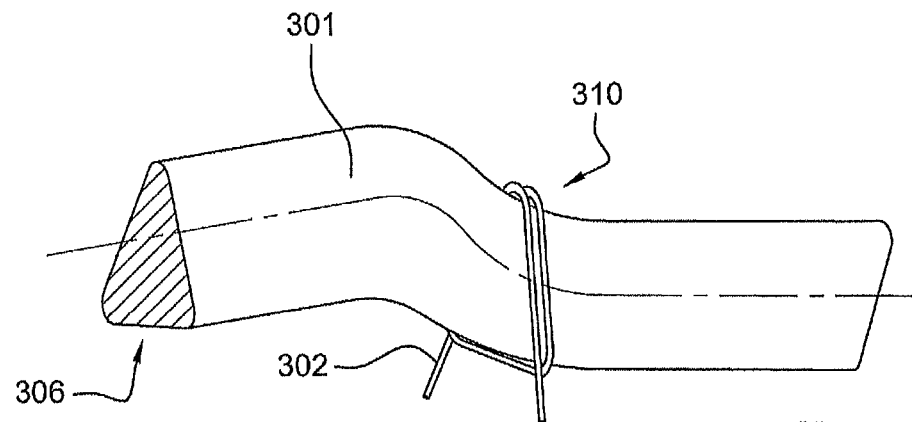
Figure 4C:
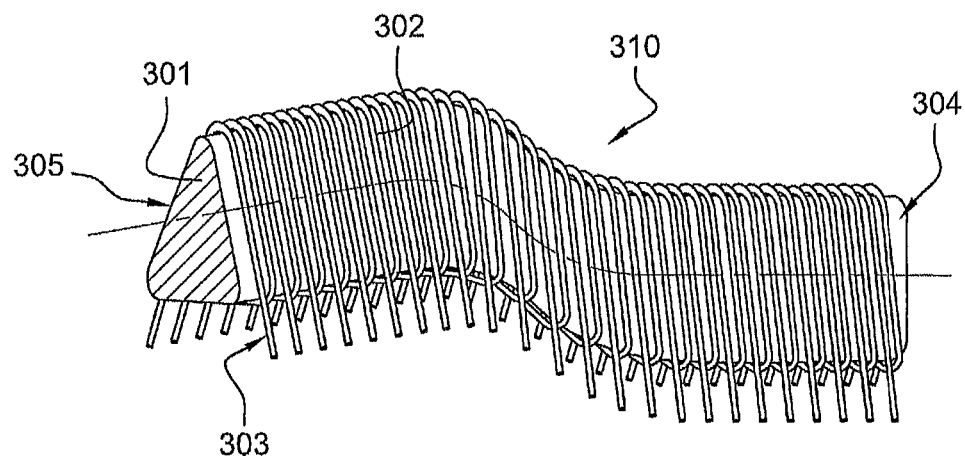
Figure 5:
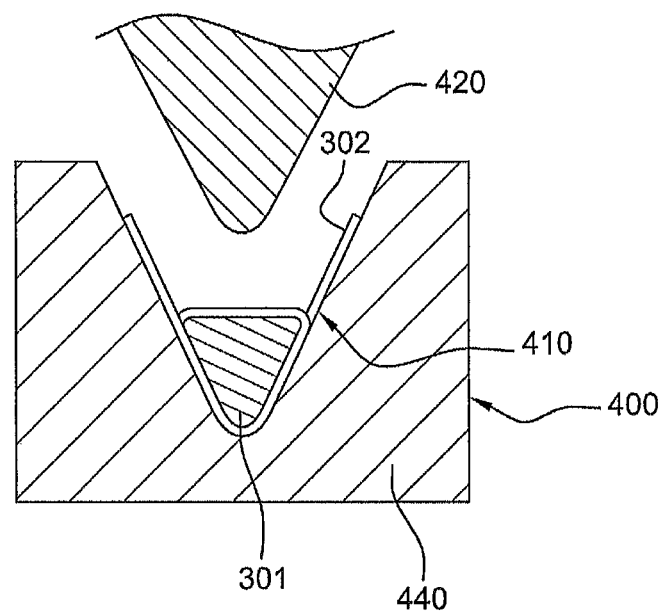
FIG. 5 represents a length of a metal reinforcement of the leading edge of the blade of a turbine engine during the second step of the process shown in FIG. 3.
Figure 6:
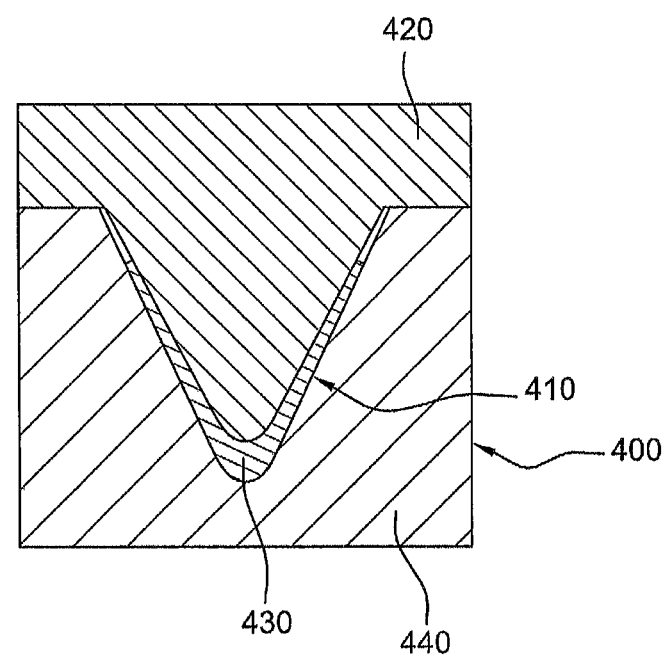
FIG. 6 shows a view of the metal reinforcement of the leading edge of the blade of a turbine engine during the third step of the process shown in FIG. 3.

The metal structure 310 is formed by the combination of and insert 301 and of a metal skeleton 303 formed by multiple metal wires 302 which encircle the periphery of the insert 301 (FIG. 4c).

According to a first embodiment, the first step 210 in the manufacturing process 200 is made up of a first sub-step for the manufacture of an insert 301 and of a second sub-step for winding multiple metal wires 302 around the insert 301 in order to manufacture the metal skeleton 303 which encloses the insert 301.

The first sub-step, shown by FIG. 4a is a step for manufacturing an insert 301 whose shape is determined according to the final shape of the part to be made. In the example of the manufacture of a metal reinforcement of the leading edge of a turbine engine, the insert 301 has the shape of the base 39 (FIG. 2) of the metal reinforcement and exhibits two curves in two distinct planes (or a twist along one axis) which follows the neutral axis of the leading edge of the blade. To this end the insert 301 is substantially in the form of a triangle which possesses two side flanks 304, 305 and a base 306.

The insert 301 may be a rigid insert, such as a one-piece insert, made, for example, by a forging, machining or casting process, or a flexible insert such as a woven insert made using a three-dimensional weaving process.

Irrespective of the type of process used to manufacture the insert, the insert 301 may be made directly in the desired shape (i.e. with no additional deformation step) or may be made in two successive operations (if the nature of the insert material allows this): a first operation involving making a substantially rectilinear part and a second operation involving shaping the rectilinear part so as to make the insert in the desired shape (i.e. with two curves for manufacturing the reinforcement of the blade of a turbine engine).

For manufacturing a reinforcement for the blade of a turbine machine the insert 301 is advantageously a titanium-based metal insert.

When the metal insert 301 is made by a weaving process, the insert is woven using metal wires, for example using titanium wires and/or silicon carbide and titanium based (SiC—Ti) wires, and/or wires coated with Boron (SiC-Boron). The wires may also be non-metallic wires made of Silicon Carbide SiC—SiC)

Whatever materiel is used to make the insert 301, the material in question must exhibit properties which allow superplastic forming and diffusion welding to be carried out.

In the example of manufacturing a metal reinforcement for the blade of a turbine engine, the metal insert 301 is advantageously made of titanium.

For manufacturing a hollow metal reinforcement (not shown), the metal insert is replaced by a "transient insert" made of a material which is different to the material used for making the metal reinforcement. The term "transient insert" refers to an insert which is not intended to be permanent and which is only necessary for making the hollow metal reinforcement of the leading edge. The transient insert is therefore not present in the metal insert in its final state, and does not in any way contribute to the mechanical characteristics of the metal reinforcement.

The transient insert is, for example, made of a material which is capable of withstanding high temperatures, of the order of 900° C., high pressures, of the order of 1000 bar, and which is compatible with the materials used in the manufacture of the metal reinforcement in order not to create impurities or oxidation.

The material of the transient insert must also be capable of undergoing chemical attack involving dissolution by a chemical reagent.

Advantageously the transient insert is made of copper, quartz or silica.

The shape of the transient insert depends on the desired shape of the final internal cavity of the metal reinforcement.

The second sub-step is a step for winding multiple metal wires, which are initially rectilinear in form, around the insert 301.

According to one example of winding, shown in FIG. 4b, the metal wire 302 is wound onto the insert 301 so as to make at least one loop around the insert 301. According to the example of winding shown in FIGS. 4b and 4c, the step involving winding of the metal wires is carried out in such a way that for a metal wire wound around the insert 301, the insert 301 exhibits, on its lateral flanks 304, 305, two passes of metal wire, and only one pass of metal wire on its base 306.

Thus the winding starts on the first lateral flank 305 of the insert 301. The metal wire is then bent at the peak of the insert 301 such that the metal wire makes contact with the second lateral flank 304 of the insert 301. The metal wire is then once more bent at the junction between the second flank 304 and the base 306 so that it follows the base of the insert 301. The winding is terminated by passing the metal wire once more over the first lateral flank 305 then over the second lateral flank 304.

Thus the wound wire 302 is formed of five rectilinear parts surrounding the insert 301.

Insert 301 is then surrounded by multiple wound metal wires 302 which form the metal skeleton 303 of the metal structure 310. FIG. 4c in particular shows the end of the winding sub-step.

The winding sub-step may be carried out from a continuous rectilinear wire cut to the desired length once the winding is completed or from multiple rectilinear metal wires cut to the desired length.

The thickness of the part to be made may vary; the thickness of the metal wires used may vary along the length of the part.

The space which separates two wound metal wires 302 (i.e. the positioning pitch between the metal wires) is defined depending on the thickness of the metal wire 302 and on the requirements of the material needed to make the part. The metal part to be made may be of variable thickness, the positioning pitch of the metal wires may be variable and the thicknesses of the metal wires may also be different over the length of the part so as to match the variable thicknesses of the part.

The example of winding with metal wires, shown in FIGS. 4b and 4c is not, restrictive and other types of winding around the insert 301 are also possible.

The winding sub-step may also involve winding several layers of metal wires 302 around the insert 301.

This first example of the manufacture of the metal structure 310 is particularly suited to use with a rigid insert 301.

According to a second example of manufacturing the metal structure 310, the first step 210 of the manufacturing process 200 involves a first sub-step for manufacturing an insert 301 as described previously, a second sub-step for bending multiple metal wires 302 substantially into an A-shape which exhibits a loop substantially in the shape of the insert 301, and a third step of introducing the insert manufactured during the first sub-step into each loop of each metal wire formed beforehand during the second sub-step, in order to create a metal skeleton enclosing the insert 301.

This second example of the manufacture is particularly well suited for use with a flexible insert, such as a woven insert.

The metal wires (302) wound around the insert are principally titanium wires. However, it is possible to incorporate silicon carbide and titanium (SiC—Ti) based wires, Boron coated wires (SiC-Boron wire) or Silicon Carbide wires (Sic-SiC wire) into the metal structure 310, which is based on titanium wires, in order to create structural reinforcements in an isolated and localised manner in the part to be made.

The second step 220 of the manufacturing process 200 is a step involving positioning of the metal structure 310, made in the previous step, in forming tooling 400.

The forming tool 400 includes a die 440 which has a cavity 410 which corresponds to the final external shape of the metal reinforcement 30 (FIG. 1) and a punch 420 which corresponds to the final internal shape of the metal reinforcement of the leading edge.

The positioning step 220 is carried out by positioning the metal structure 310 in the cavity 410 of the die 440 of the forming tool 400.

Since the three-dimensional metal structure 310 substantially has a shape which complements that of the cavity 410, the positioning step is carried out simply by fitting the metal structure forming the pre-form of the part to be made. This step is also facilitated by the possible elastic deformation of the ends of the metal skeleton formed by the rectilinear ends of the metal wires 302.

According to another example of the manufacture, the preform of the part to be made may be made up of multiples of the metal structure 310 as described above. In this example of the manufacture the positioning step is then carried out by positioning the various three-dimensional metal structures 310 in the cavity 410 of the forming tool 400. Positioning is achieved by successive positioning of the various metal structures 310 along the length of the cavity 410 (i.e. along the longitudinal axis of the cavity). The division of the pre-form into multiple sections of metal structures therefore means that positioning of the complex-shaped preform in the cavity 410 of the tooling is facilitated even further.

The third step 230 in the manufacturing process 200 is a step involving hot-pressing of the metal structure 310 positioned in the tooling 400.

According to a first example of the manufacture, the hot pressing is isostatic pressing (HIP, or Hot Isostatic Pressing).

Hot isostatic pressing is a manufacturing process that is widely used and well-known for reducing the porosity of metal and for having an influence on the density of many materials. The isostatic pressing process in addition improves the mechanical properties and operational performance of materials. Isostatic pressing is carried out at high temperature (conventionally between 400° C. and 1400° C., at a temperatures of the order of 1000° C. for titanium) and at isostatic pressure.

Thus the application of heat combined with internal pressure removes the empty spaces in stacks as well as microporosities, by means of a combination of plastic deformation, creep and diffusion welding, so as to form a one-piece metal part 430.

In the context of the manufacture of a metal reinforcement for the blade of a turbine engine the one-piece part 430 which results from the isostatic pressing step possesses a shape approaching that of the final shape of the metal reinforcement 30. The one-piece part 430 is then removed from the mould of the tool 400.

The isostatic pressing step is carried out under vacuum, advantageously under secondary vacuum, either in welded tooling in which the secondary vacuum is created, or in an autoclave vacuum bag, with the choice of process depending on the number of parts to be produced. Secondary vacuum prevents oxygen being present in the tooling and in the metal structure during the isostatic pressing stage of the titanium.

According to a second example of the manufacture, hot pressing can also be an isothermal forging process using a press in an evacuated enclosure.

The tooling is made of a mechanical alloy known as a superalloy or high-temperature alloy.

The hot-pressing step 230 can include a prior step involving cleaning, degreasing and/or chemical attack on the metal structure 310 so as to remove residual impurities from the various metal wires 302. Advantageously the step for cleaning of impurities is achieved by soaking the metal structure 310 in a bath of cleaning agent or chemical reagent.

In the context of the manufacture of a hollow metal reinforcement the process according to the invention may involve, after the metal part is released from the mould, an additional step of chemical attack on the insert which is an integral part of the compacted metal part 430. The chemical reaction is carried out by means of a chemical reagent known to react with the material of which the insert is manufactured. The chemical attack on the transient insert dissolves the transient insert so that the space formerly occupied by the dissolved insert forms the internal cavity of the hollow metal reinforcement. Advantageously the chemical attack step is achieved by soaking the one-piece part 430 in a bath containing the chemical reagent known to dissolve the insert. The chemical reagent is, for example, an acid or a base.

Advantageously the chemical reagent is capable of dissolving copper, quartz or even silica.

In combination with these main manufacturing steps, the process according to the invention may also include a finishing step and rework step involving machining of the one-piece metal part obtained out of the tooling in order to obtain the reinforcement 30. This re-work step includes:

A step for re-working the profile of the base 39 of the reinforcement 30 so as to give it a finer finish and in particular of the aerodynamic profile of the leading edge 31;

A step for re-working the flanks 35, 37, where this step involves in particular trimming of the flanks 35, 37 and the thinning of the intrados and extrados flanks;

a finishing step allowing the required surface finish to be obtained.

In combination with these main manufacturing steps, the process according to the invention may also include non-destructive testing steps on the reinforcement 30 to check the geometric and metallurgical compliance of the assembly obtained. By way of example, the non-destructive testing may be carried out using an X-ray procedure.

The present invention has primarily been described with the use of titanium-base metal wires. The manufacturing process is however also applicable using any metallic material which exhibits properties which allow superplastic forming and/or diffusion welding to be carried out, such as aluminium-based metal wires.

The invention has been described in particular for the manufacture of a metal reinforcement of a composite blade of a turbine engine. The invention is however also applicable for the manufacture of a metal reinforcement of a metal blade of a turbine engine.

The invention has been described in particular for the manufacture of a metal reinforcement of a leading edge of a blade of a turbine engine. The invention is however also applicable for the manufacture of a metal reinforcement of the trailing edge of blade of a turbine engine or even for the manufacture of a metallic reinforcement of a composite or metallic propeller.

The other advantages of the invention are, in particular, as follows:
- reduction in manufacturing costs;
- reduction in manufacturing times;
- simplification of manufacturing operations;
- reduction in materials costs.

The invention claimed is:

1. A process for manufacturing a metal part, the process comprising:
    manufacturing a three-dimensional metal structure made up of an insert which has properties which allow superplastic forming and diffusion welding to be carried out, and of multiple separate metal wires each encircling a periphery of said insert, wherein a space separates at least two adjacent separate metal wires of the multiple separate metal wires, and wherein said three-dimensional metal structure forms a preform of said metal part;
    positioning said three-dimensional metal structure in a forming tool, and
    hot-pressing said three-dimensional metal structure which causes agglomeration of said three-dimensional metal structure, so as to obtain said metal part.

2. The process for manufacturing a metal part according to claim 1, wherein said manufacturing includes:
    a first sub-step for manufacturing said insert;
    a second sub-step for winding said multiple separate metal wires around said insert.

3. The process for manufacturing a metal part according to claim 2, wherein said sub-step for manufacturing said insert is performed by forging or machining or casting or by a three-dimensional weaving process.

4. The process for manufacturing a metal part according to claim 1, wherein the manufacturing comprises separately bending each of the multiple separate metal wires so that, after bending, each of the multiple separate metal wires forms one or more loops to encircle the periphery of said insert.

5. The process for manufacturing a metal part according to claim 4, wherein, after bending each of the multiple separate metal wires, the insert is inserted into the one or more loops of each of the multiple separate metal wires.

6. The process for manufacturing a metal part according to claim 1, wherein said process is a process for manufacturing a metal reinforcement for a leading edge or trailing edge of a blade of a turbine engine, or of a metal reinforcement of a propeller such that said metal part obtained during said hot pressing is a metal reinforcement.

7. The process for manufacturing a metal part according to claim 1, wherein said hot-pressing is an isostatic pressing step or an isothermal forging step.

8. The process for manufacturing a metal part according to claim 1, wherein said manufacturing includes:
    a first sub-step for manufacturing said insert;
    a second sub-step of bending said multiple separate metal wires such that each metal wire of said multiple separate metal wires exhibits at least one loop; and
    a third sub-step of inserting said insert in each loop of said multiple separate metal wires.

9. The process for manufacturing a metal part according to claim 1, wherein said insert is a metal insert.

10. The process for manufacturing a metal part according to claim 1, wherein said multiple separate metal wires are bent into an A-shape.

11. The process for manufacturing a metal part according to claim 1, wherein said multiple separate metal wires are titanium-based wires and/or SiC-Titanium wires.

12. The process for manufacturing a metal part according to claim 1, wherein said process includes:
    manufacturing multiple three-dimensional metal structures made up of an insert and of multiple metal wires surrounding said insert, where said multiple three-dimensional metal structures form a pre-form of said metal part;
    positioning said multiple three-dimensional metal structures in a forming tool:
    hot-pressing said multiple three-dimensional metal structures which causes agglomeration of said multiple three-dimensional metal structures, so as to obtain said metal part.

13. The process for manufacturing a metal part according to claim 1, wherein the metal part is a turbine engine blade metal reinforcement.

14. The process for manufacturing a metal part according to claim 1, wherein the space depends on a thickness of said multiple separate metal wires encircling the periphery of said insert.

* * * * *